(12) United States Patent  
Wang et al.

(10) Patent No.: US 9,686,156 B2  
(45) Date of Patent: Jun. 20, 2017

(54) NETWORK FLOW MONITORING

(71) Applicants: Xinyuan Wang, Clifton, VA (US); Zuotao Li, Herndon, VA (US)

(72) Inventors: Xinyuan Wang, Clifton, VA (US); Zuotao Li, Herndon, VA (US)

(73) Assignee: CYBERROCK INC., Clifton, VA (US)

( * ) Notice: Subject to any disclaimer, the term of this patent is extended or adjusted under 35 U.S.C. 154(b) by 255 days.

(21) Appl. No.: 14/708,262

(22) Filed: May 10, 2015

(65) Prior Publication Data

US 2015/0326460 A1 Nov. 12, 2015

Related U.S. Application Data

(60) Provisional application No. 61/991,462, filed on May 10, 2014.

(51) Int. Cl.
  *H04L 12/26* (2006.01)
  *H04L 29/06* (2006.01)

(52) U.S. Cl.
  CPC .......... *H04L 43/026* (2013.01); *H04L 43/062* (2013.01); *H04L 43/0876* (2013.01); *H04L 43/16* (2013.01); *H04L 63/0407* (2013.01); *H04L 63/1408* (2013.01); *H04L 2463/146* (2013.01)

(58) Field of Classification Search
  CPC ............. H04L 2463/146; H04L 43/026; H04L 43/062; H04L 43/0876; H04L 43/16; H04L 63/0407; H04L 63/1408
  See application file for complete search history.

(56) References Cited

U.S. PATENT DOCUMENTS

| | | | | |
|---|---|---|---|---|
| 6,499,061 B1* | 12/2002 | Benayoun | ........... | H04L 12/4641 370/218 |
| 6,934,250 B1* | 8/2005 | Kejriwal | ............... | H04Q 3/0091 370/229 |
| 8,560,413 B1* | 10/2013 | Quarterman | ........ | H04L 63/1483 705/35 |
| 8,724,626 B1* | 5/2014 | Caputo, II | .............. | H04L 45/50 370/252 |
| 9,407,537 B1* | 8/2016 | Shekhar | ................ | H04L 45/245 |
| 9,411,787 B1* | 8/2016 | Lad | ........................ | H04L 41/046 |
| 2004/0098625 A1* | 5/2004 | Lagadec | ................. | G06Q 30/02 726/4 |
| 2015/0063349 A1* | 3/2015 | Ardalan | .................. | H04L 45/56 370/381 |
| 2015/0317197 A1* | 11/2015 | Blair | ...................... | G06N 7/005 714/47.3 |
| 2016/0345219 A1* | 11/2016 | Brisebois | ............ | H04W 36/023 |

* cited by examiner

*Primary Examiner* — Khaled Kassim  
(74) *Attorney, Agent, or Firm* — David Grossman

(57) ABSTRACT

A network flow monitoring and analysis system comprises flow labeling agent(s), sensor(s), controller(s), and correlation engines(s). The flow labeling agent(s) label at data packet flow unique and covert label(s). The sensor(s) observe data packet flow for the unique and covert label(s) and generate examination report(s) from the observations. The examination report(s) comprise information such as: location information; time information; target information; path information; and flow information. The controller(s) communicate instructions to the labeling agent(s) and sensor (s), receive event information and manage the correlation engine(s). The correlation engine(s) correlate information from information such as the target information; event information; path information; and flow information.

18 Claims, 12 Drawing Sheets

NETWORK FLOW MONITORING

BRIEF DESCRIPTION OF THE SEVERAL VIEWS OF THE DRAWINGS

Embodiments of the present invention are illustrated by way of example, and not by way of limitation, in the figures of the accompanying drawings and in which like reference numerals refer to similar elements.

Example

Example

Example

Example

Example

Example

Example

Example

Example

Example

Example

Example

DETAILED DESCRIPTION OF EMBODIMENTS

Figure 1:
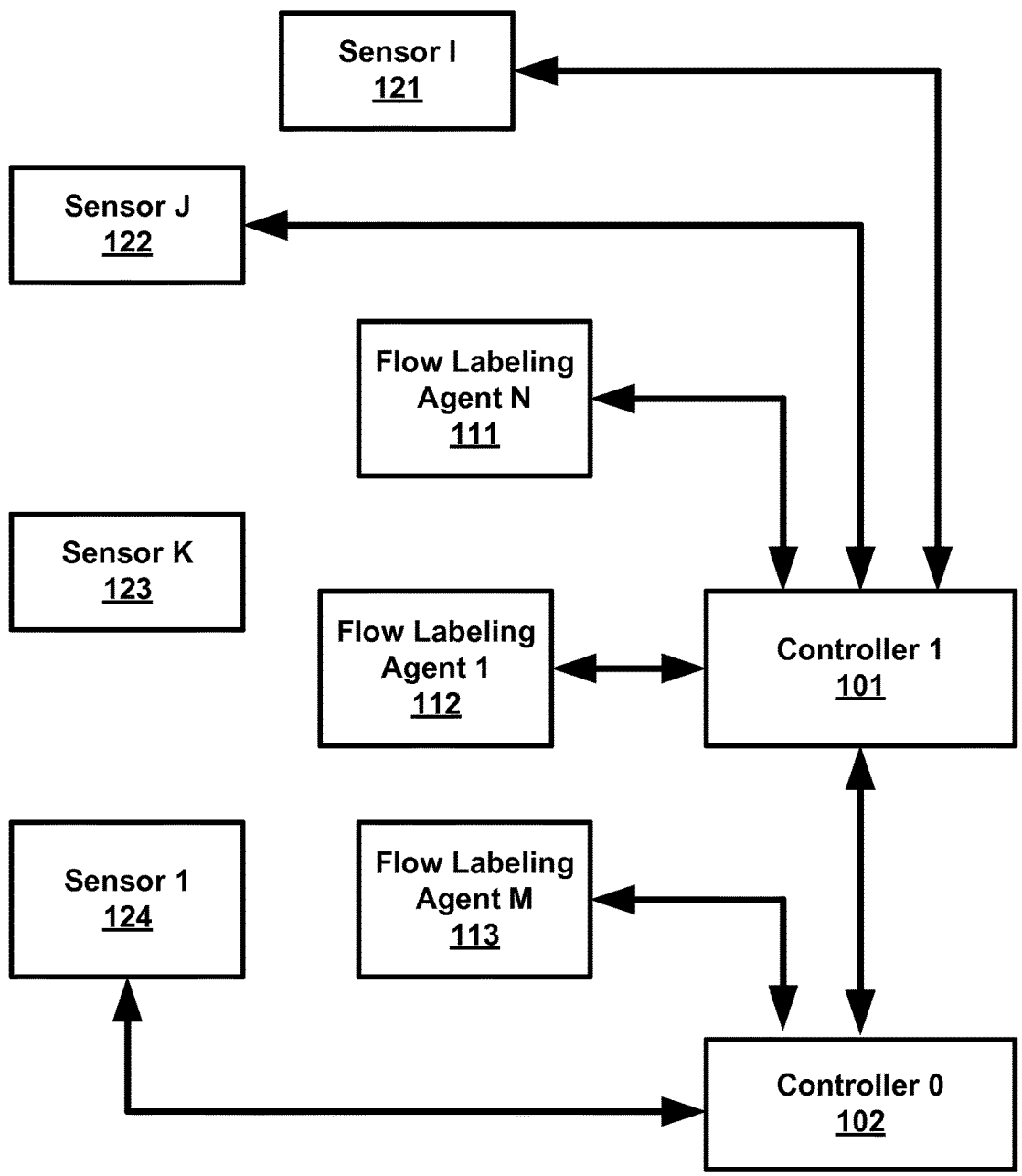
FIG. 1 is a block diagram illustrating an application architecture and communications among the architectural components as per various aspects of an embodiment of the present invention.

Embodiments of the present invention correlate security events, targets, and network flows employing, for example, network flow monitoring, labeling, tracking and tracing. Embodiments of the present invention may be employed in the field of networks, information systems, and cyber security. The term flow relates to a sequence of digitally encoded packets of data (data packets) traveling through a communications system such as, for example, a digital network.

There has been an explosion of network connected systems, applications, and devices in the age of Internet and ubiquitous networking. Global organizations, enterprises, and governments may be subject to cyber-attacks, and there is every reason to believe that increasing capable and sophisticated attacks may penetrate existing network defense. Many evasion techniques have been deployed to evade detection. As a result, break-ins or data breaches may be discovered by external part(ies) and break-ins and breaches may go undiscovered for months or even longer. Securing network(s), system(s), and application(s) may be challenges faced by global organization(s), enterprise(s), government(s), and/or the like.

Network flow monitoring and analysis may be applied in, for example, network defense, situation awareness, incident handling, forensics, combinations thereof, and/or the like. For example, network flows may help to identify compromised servers, hosts, systems, applications within organization networks, command and control servers, mitigate on-going attacks, conduct forensic analysis, and potentially seek out the sources of the attacks.

Source and destination addresses for data flows may provide information about a specific flow and may be employed to correlate among the flows. However, widely used proxies, spoofing, and other anonymizing measures (for example, Tor, aka Onion Router, an open source anonymity system) may hide the real source or destination address. As a result, counter measures that only monitor this information may limit the visibility of network flows by hiding the correlations among the flows, and thus, limit the effectiveness of some network flow monitoring and analysis. At least some of the embodiments employ method(s), system(s), and apparatus(es) configured to improve some of these practice(s).

Some of the various embodiments are configured to apply a correlation engine to network flow monitoring and analysis in cyber security that is configured to correlate security events, targets, and/or network flows through network flow monitoring, labeling, tracking, tracing, combinations thereof, and/or the like. At least some of the various embodiments employ an architecture of network flows monitoring, labeling, and tracing configured to overcome commonly used detection evasion measures such as proxies, spoofing, anonymity systems, combinations thereof, and/or the like.

According to some of the various embodiments, flows may be correlated in real-time, near real-time, and/or post event to form an integral path. Flow information may comprise a source IP address, a source port, a destination IP address, a target port, a protocol, a combination thereof, and/or the like of the network flow. This path may be employed to, for example, identify intermediate nodes, trace back to the source of a cyber-attack, combinations thereof, and/or the like. Still further, security incidents, events, targets, network flows, combinations thereof, and/or the like may be correlated to identify, for example, compromised servers, hosts, systems, applications, combinations thereof, and/or the like. These compromised components may be within networks, malware command and control servers, combinations thereof, and/or the like. Embodiments may employ at least part of the integral path to seek out sources of attacks.

According to some of the various embodiments, correlations among the network flows, targets, security events, combinations thereof, and/or the like may be displayed. Events may comprise security event(s) such as, but not limited to: an intrusion detection system alert, system or networks monitoring and control event, combinations thereof, and/or the like. An event may be associated with a target and a target may be associated with multiple events. Various degrees of correlations may be visualized using distinct visual symbols.

Some of the various embodiments may be employed in combination with network security and privacy controls, such as, for example, anti-malware, intrusion detection systems (IDS), intrusion prevention systems (IPS), encryption, anonymity systems, combinations of the above, and/or the like to protect ever increasing and sophisticated cyber threats.

Network flow monitoring and analysis may be employed in network defense, situation awareness, incident handling, attack mitigation, forensics, combinations of the above, and/or the like. A network flow may be identified by a set of information such as, for example: source and destination addresses (i.e. IP addresses), source and destination ports, protocol number(s), combinations thereof, and/or the like. Network flows may be correlated, for example, by their source and destination IP addresses. As an illustration, if one flow's destination IP address is the same as the other flow's source address, these two flows may be connected and therefore correlated. Network flow monitoring and analysis may help to identify compromised servers, hosts, systems, applications, combinations thereof, and/or the like within networks, malware command, control servers, attack paths, combinations thereof, and/or the like. The results of this monitoring may be employed to seek out the sources of the attacks.

An anonymizer or an anonymous proxy is a tool that attempts to make activity on the Internet untraceable. It is a proxy server computer that acts as an intermediary and privacy shield between a client computer and the rest of the Internet.

In some cyber-attacks, the attacker may not attack directly from his own host (with his actual IP address exposed), but may instead connect through a number of intermediate nodes (proxies), or even low-latency anonymity systems, such as, for example, Anonymizer or Tor, before attacking the final target. Anonymizer attempts to make activity on the Internet untraceable. It may employ, for example, proxy server computer(s) that act as an intermediary and privacy shield between a client computer and the rest of the Internet. It may make the actual attacking source address hidden from an observer. Some of the various embodiments correlate network flows that otherwise appear to be independent from each other. This may enhance network flows monitoring, network flow analysis, situation awareness, incident handling, attack mitigation, forensics, countermeasures, combinations thereof, and/or the like by increasing the visibility of attack path(s) normally hidden when correlations depend only on source and destination addresses.

Some aspects of various embodiments may identify, label, track and trace network packet flows in real-time and/or near-real time employing, at least in part, a plurality of sensors, flow labeling agents, and/or controllers. A flow labeling agent may label a network flow. The label, according to some of the various embodiments, may comprise a unique, dynamic, and covert label.

According to some of the various embodiments, a covert label may be a substantially invisible label. A covert label may comprise a label that is not readily apparent when analyzed as a plain text data stream. A covert label may comprise a sequence of binary bits transparently encoded into a network flow without changing the packet header or content. An illustration of such a label is disclosed in U.S. Pat. No. 7,724,782 titled "Interval centroid based watermark Labeling." This patent discloses a technique where a watermark is applied to a flow through by adjusting timing intervals between data in a flow. Another illustration is disclosed in U.S. Pat. No. 8,804,737 titled "Encoding watermarks in a sequence of sent packets, the encoding useful for uniquely identifying an entity in encrypted networks." This patent discloses a technique where a watermark is applied to a flow by adjusting the data rate of a data flow. In another example, a covert label may comprise a label where content is changed, but not readily identifiable. This may be achieved by introducing small bit changes in a bit stream. In yet another example, a covert label may comprise the data itself. In such an example, a series of hash values may be calculated from the portions of the data flow. The series of hash values may be employed to later identify the data stream. These are merely examples of covert label(s). It is envisioned that various embodiments may employ other covert label(s).

According to some of the various embodiments, the label may comprise a unique label. A unique label may be a label that is not identical to other labels applied to a particular data flow and/or sub flow. A unique label may be generated by the system.

According to some of the various embodiments, the label may comprise a dynamic label. A dynamic label may be a label that changes over time. Some of the various dynamic labels may be generated in real-time. At least part of the dynamic label may be generated employing a random and/or pseudo random number generator. At least some of the dynamic label may be generated employing a look-up table.

According to some of the various embodiments, sensor(s) may be instructed by a controller to find or identify a labeled flow. The sensor(s) may report back to the controller information relating to identified and/or found labeled flow. A sensor may be configured to simultaneously track multiple flows.

A controller may manage one or more flow labeling agents and sensors. For some of the various embodiments, a system configuration may comprise at least one flow labelling agent, one controller, and multiple sensors. For large-scale deployment(s), there could be multiple flow labelling agents, multiple controllers and multiple sensors. Various controllers may communicate and collaborate with one another and with automatic failover. Thus, a system may be configured to reduce the risk of a single point of failure.

Some of the various embodiments may exploit the observation that interactive connections (such as, for example, Telnet, SSH, Web) may bidirectional. Backward network flows may be covertly labeled, tracked, and traced. In this description, the term invisible means substantially invisible or covert as discussed earlier. In some embodiments, flows may be correlated and traced across a network, from the cyber-attack victims all the way back to the attackers. Some of the present embodiments employ a distinct approach in correlating flows. Some of the various embodiments may associate network flows based on a tracking label, not based on the source or destination addresses. If a label employed to track a flow is both robust and unique, backward flows may be correlated through the tracking label to form an integral path which may be employed to seek out the source of an interactive connection, even with known countermeasures attempting to hide the attack paths. If two flows belong to the same path, the two flows may be correlated in real-time and/or near real-time regardless of their source or destination addresses. If there is a gap between two correlated flows on an identified path and there is no observed flow bridging the gap, a virtual flow may be generated to bridge the gap on this path. There may be one or more correlated flows, zero, one or more virtual flows on one path.

Some of the various embodiments may comprise a secured communication infrastructure, comprising a secured communication protocol, an implementation of the protocol, a specification and implementation of a networking interface, a combination thereof, and/or the like. This secured communication infrastructure may enable bidirectional secured communications between, for example, a controller and one or more labelling agents, between a controller and one or more sensors, and a controller and one or more different controllers. For example, assuming there is a security event and alert generated from an IDS system, it may be reported to a controller in real-time or near real-time. The controller may decide to instruct a flow labeling agent to label a specific network flow as part of the backward traffic which triggered the alert. In addition, this controller may notify sensors across the network to watch for this specific label. Sensors may be deployed, such as passive network taps, across the network. The sensors may check passing traffic for the presence of the indicated label and report back to the controller about where labeled flows are detected. These labeled flows may be correlated to form an integral path. Based on this constructed path across the network, the controller may determine where the attack originated.

According to some of the various embodiments, network flows may be correlated with security events and targets. One or more events may be correlated with one or more targets and one or more events. Examples of the security events may include alerts from cyber defense systems such as, for example, IDS, IPS, anti-malware, firewalls, combinations thereof, and/or the like. In some situations, multiple events may be associated with one target. An event may be correlated with a specific path. A path may consist of one or more flows. Flows on a common path may be correlated to the same event.

According to some of the various embodiments, various correlations may be made. For example, paths may be associated with a target. In another example, flows may be correlated if they share the same target. In yet another example, different flows may be correlated if a portion of their associated paths overlap. In yet another example, events may be correlated with flows if a portion of their associated paths overlap. In yet another example, multiple targets correlated with the flows could be further correlated if a portion of their associated paths overlap.

According to some of the various embodiments, different degrees of correlation may be employed. For example, flows on the same path may have deterministic correlations, while events may have non-deterministic correlations (or weaker correlations) because they are correlated with one another as a portion of their associated paths overlap.

According to some of the various embodiments, correlation mechanism(s) may be employed that produce various types of correlations among flows, events, and targets within time interval constraints. In addition, various degrees of correlations may be computed, stored, and visualized. The degrees of non-deterministic correlations may be normalized and one or more damping factors applied based on time intervals and the percentages of path overlapping. Time intervals may be calculated based on timestamps of flows and events.

According to some of the various embodiments, a correlation engine may be employed as part of a controller. The correlation engine may take stored targets, events, paths, flows, combinations thereof, and/or the like in a database as input, and produce correlations as output.

According to some of the various embodiments, a correlation knowledge base, as a component within a controller, may store and manage correlations. Correlations may, for example, be searched and retrieved through a user interface. These correlations may be applied to various applications such as, for example, network defense, situation awareness, incident handling, attack mitigation, forensics, combinations thereof, and/or the like. For example, correlations may help in real-time (or near real-time) to identify compromised servers, hosts, systems, applications, combinations thereof, and/or the like within networks. Correlations may be employed in real-time (or near real-time) to detect malware command and control servers and to seek out sources of attack.

According to some of the various embodiments, correlations such as, for example, stored and/or retrieved correlations, self and/or other produced correlations, graphical visualization of network paths, combinations thereof, and/or the like may be displayed.

Example FIG. 1 is a block diagram illustrating an application architecture and communications among the architectural components as per various aspects of an embodiment of the present invention. The architecture comprises a plurality of sensors 121, 122, 123, 124, flow labeling agents 111, 112, 113, and controllers 101, 102 in accordance with an embodiment of the present invention. As illustrated, controller 101 is configured with bi-directional communications between: sensors 121 and 122; and flow labeling agents 111 and 112. Controller 102 is configured with bi-directional communications between: controller 101, sensors 124 and flow labeling agent 113.

Figure 2:
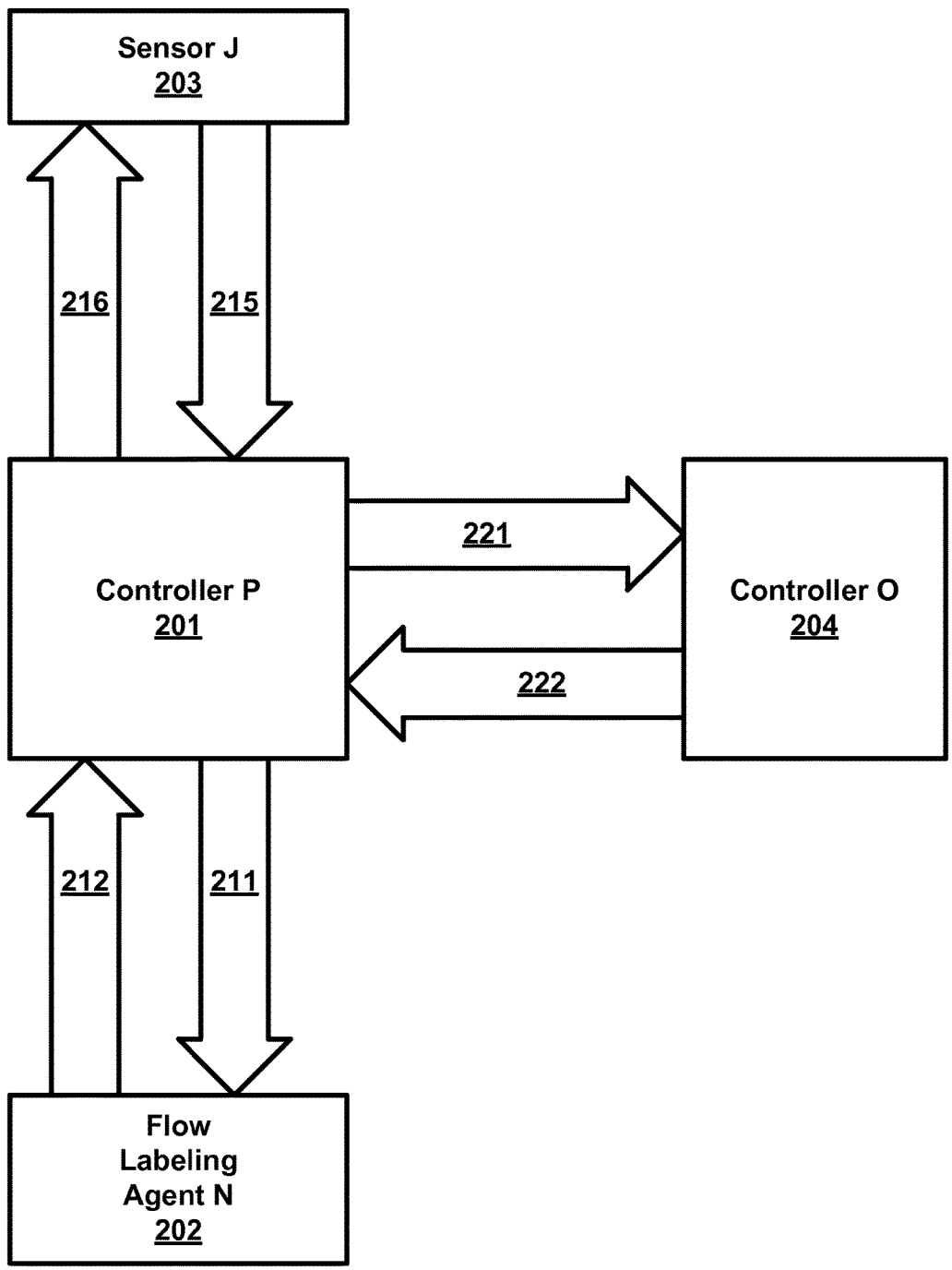
FIG. 2 is a block diagram illustrating bi-directional communications between controller(s), a sensor, and a flow labeling agent as per various aspects of an embodiment of the present invention.

Example FIG. 2 is a block diagram illustrating bi-directional communications between controller (e.g. 201 and 204), a sensor 203, and flow labeling agent 202 as per various aspects of an embodiment of the present invention. As illustrated, controller 204 is configured with bi-directional communications with controller 201; controller 201 is configured with bi-directional communications with sensor 203 and flow labeling agent 202.

Controller 201 may communicate instructions 211 to flow labelling agent 202 to label a specific flow. The flow labelling agent 202 may generate a response 212 to controller 201 with information related to label(s) applied to data flow(s). Controller 201 may communicate instructions 216 to sensor 203 to watch for flow(s) with a specific label(s). Sensor 203 may communicate a response 215 to controller 201 with detected flow information. Controller 201 may be configured to exchange information 221 and 222 with controller 204. The exchange of information may be performed in various modes, such as, for example: a request/response mode, a publish/subscribe mode, combinations thereof, and/or the like.

Figure 3:
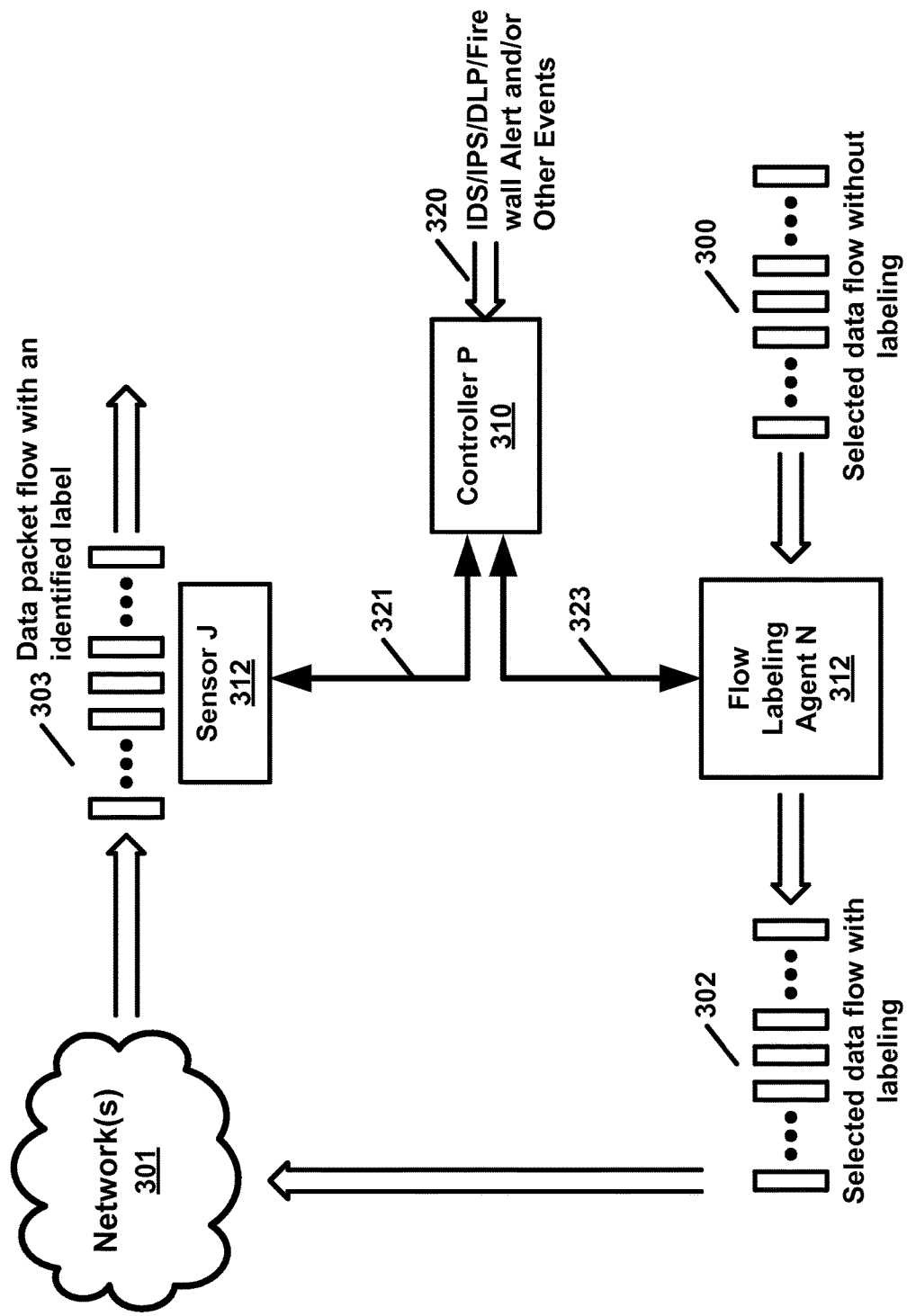
FIG. 3 is a block diagram illustrating a process of identifying flows of interest and correlate disconnected network flows to form an integral path in accordance as per various aspects of an embodiment of the present invention.

Example FIG. 3 is a block diagram illustrating the identification of flows of interest and the correlation of disconnected network flows to form an integral path in accordance as per various aspects of an embodiment of the present invention. In other words, FIG. 3 depicts a process of identifying, labelling, tracking, and tracing a flow. As illustrated, a security event 320, such as for example, an alert generated from an IDS system, may be reported to controller 310. This report may be in real-time and/or near real-time. Controller may communicate instructions 323 to flow labelling agent 311 to label a specific packet flow as part of backward traffic which may have triggered the alert 320. In addition, controller 310 may communicate a notification 321 to sensor(s) 312 across a network about a specific label for which to watch. The sensor(s) 312 across the network may check the passing traffic for the presence of the indicated label and communicate a report 321 to the controller 310 about where the labeled flow 303 is detected. The labeled flow 302 and the detected flow 303 with the label may be separated by a network 301. Network 301 may comprise, for example, the Internet, intranet(s), unidentified network(s) 301, a combination thereof, and/or the like. The two flows 302 and 303, otherwise separated, may be correlated by the specific label. The original flow 300 and labeled flows 302 and 303 may be correlated to form an integral path. According to some of the various embodiments, the correlation may be automatic.

Figure 4:
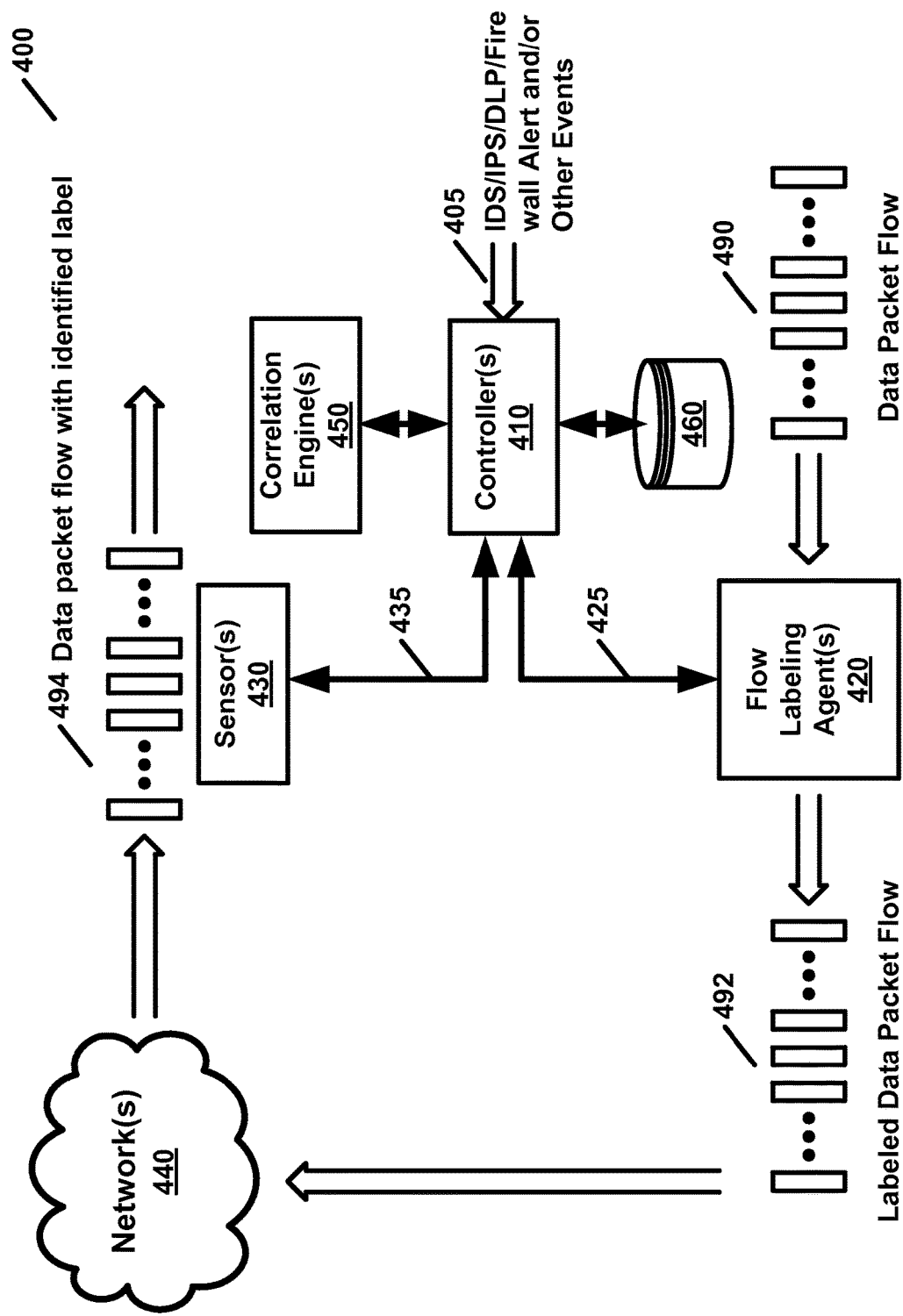
FIG. 4 is a system block diagram as per various aspects of an embodiment of the present invention.

Example FIG. 4 is a system block diagram as per various aspects of an embodiment of the present invention. As illustrated in this diagram a network flow monitoring and analysis system 400 may comprise at least one flow labeling agent (e.g. 420), at least one sensor (e.g. 430), at least one controller (e.g. 410), and at least one correlation engine (e.g. 450).

According to some of the various embodiments, flow labeling agent(s) (e.g. 420) may be configurable via labeling instructions (e.g. 425) to label at least part of a data packet flow (e.g. 490) with at least one unique, dynamic, and covert label with a set of labels applied to the data packet flow. The result of the labeling may be a labeled data packet flow (e.g. 492).

The term unique may refer to a label that has a unique value within labels being applied to the data packet flow (e.g. 490). In some embodiments, unique may refer to a label that has a unique value within labels being applied to multiple data packet flows (e.g. 490). In yet other embodiments, unique may refer to a label that has a unique value within labels being applied to data packet flows (e.g. 490) within a network (e.g. 440). In yet other embodiments, unique may refer to a label that has a unique value within labels being applied to data packet flows (e.g. 490) within multiple networks (e.g. 440).

The term dynamic may refer to the characteristic that labels applied to data packet flows (e.g. 490) may change over time. A changing label may be a label that is periodically changed as it is touched by various sensor(s) (e.g. 430), flow labeling agent(s) (e.g. 420) and/or other network devices such as, for example, a network switch, router, combination thereof, and/or the like.

The term covert may refer to the characteristic that labels applied to data packet flows (e.g. 490) are not easily detectable. For example, according to some of the various embodiments, a covert label may comprise a sequence of binary bits encoded into s network flow without changing the packet header or content, thereby, making the label difficult to detectable.

According to some of the various embodiments, some of the various covert label(s) may be encoded with a secret such as a key. In these kinds of embodiments, a key may be employed to identify the covert label. Keys may be symmetric or non-semetric.

According to some of the various embodiments, sensor(s) (e.g. 430) may observe at least part of the data packet flow (e.g. 494) for unique and covert label(s). The observation may be passive. Some of the various sensor(s) (e.g. 430) may passively observe the data packet flow (e.g. 494). The term passive means that the sensor(s) (e.g. 430) does not modify the content of the data packet flow (e.g. 494). Some of the various sensor(s) (e.g. 430) may touch the data packet flow (e.g. 494) as they observe the data packet flow (e.g. 494). This may occur when as part of dynamically modifying label(s) and/or through the normal process of routing a data packet flow (e.g. 494) through a network. For example, the routing information in a data packet flow (e.g. 494) could be modified by a network device without modifying the content of the substantive content of the data packet flow (e.g. 494).

Sensor(s) (e.g. 430) and/or flow labeling agent(s) (e.g. 420) may be implemented as stand-alone device(s) or as part of other network device(s). Examples of other network devices that may be employed as a sensor (e.g. 430) comprise, but are not limited to: a server, a compute node, a router, a switch, a firewall, a load balancer, a networking node, a storage node, a power node, a cooling node, a network appliance, a virtual appliance, system hardware with network access, a hosted module within a system, a combination thereof, and/or the like. Some nodes may be critical. A critical node may comprise a network node (e.g., host, server, device) that may play a critical role in network based attack(s), without which, the network based attacks would be severely limited.

According to some of the various embodiments, sensor(s) (e.g. 430) may generate examination report(s). The examination report(s) may comprise sensor data. The sensor data may comprise various types of information such as, for example, but not limited to: location information, time information, target information, path information, flow information, combinations thereof, and/or the like.

Location information may comprise information regarding the location of the sensor in a network. The location information may indicate the relative location of the sensor in a network. The location information may indicate the absolute location of the sensor in a network. Location information may comprise information regarding the geographic location of a sensor. The geographic location information may indicate the relative location of the sensor in a geographic region. The location information may indicate the absolute location of the sensor in a geographic region.

Time information may comprise information indicating the time that a data packet flow (e.g. 494) was observed by a sensor (e.g. 430). The time information may be in the form of a timestamp. A timestamp may comprise a sequence of characters or encoded information identifying when a certain event occurred, usually giving date and time of day, sometimes accurate to a small fraction of a second. Time information may be absolute and/or relative. Relative time may be time elapsed since a reference time and/or event. Alternatively, the time information may be in the form of a time-data report that identifies a data packet flow (e.g. 494) and a time of observation. The time information may be employed by the correlation engine to sequence the path a data packet flow (e.g. 494) is traversing.

Target information may comprise information related to one or more target(s) of a cyber-attack. For example, a target may be a networked server, a networked computer, a networked device, and/or the like. Target information may comprise a set of attributes describing the target such as name, location, IP address, combinations thereof, and/or the like. Each target may comprise an assigned labeling agent configured to recognize the target information and act accordingly.

Path information may comprise information relating to an attack path that comprises network flows that share the same covert label. These flows may be automatically serialized based on the time and location the labeled network flows were identified and reported by a sensor (e.g. 430).

Flow information may comprise a source IP address, a source port, a destination IP address, a target port, a protocol, a combination thereof, and/or the like of the network flow.

According to some of the various embodiments, controller(s) (e.g. 410) may be employed to manage all and/or a subset of the network flow monitoring and analysis system 400. Controller(s) (e.g. 410) may be implemented in various forms. For example, a controller (e.g. 410) may be implemented in a central location (e.g. a data center, on a server, in a monitoring office, combinations thereof, and/or the like). Alternatively, some controllers (e.g. 410) may be distributed. A distributed controller may be located in various IT communication devices, in regional communications offices and/or centers, combinations thereof, and/or the like. Some controllers (e.g. 410) may be configured to be employed either centrally and/or distributed. Some controller (e.g. 410) embodiments may employ dedicated hardware whereas other controllers may be implemented as part of another device. Yet other controllers may be implemented virtually.

According to some of the various embodiments, controller(s) (e.g. 410) may comprise at least one processor, at least one communications interface, and at least one non-transitory computer readable medium comprising instructions configured to cause the at least one processor to perform a network flow monitoring and analysis process. The process may comprise communicating labeling instructions to flow labeling agent(s) 420 over communications link 425 via communications interface(s). The labeling instructions may inform flow labeling agent(s) 420 information such as, for example, how and what data packet flow(s) (e.g. 490) to label, effectuating in the generation of labeled data packet flow(s) 492. The labeling instructions may comprise at least one of the following: instructions to find a labeled flow, instructions to identify a labeled flow, instructions to label data packets, instructions to correlate packet flow data, combinations thereof, and/or the like.

According to some of the various embodiments, the process may also comprise receiving examination report(s) from sensor(s) 430 over a communications link 435 via communications interface(s). The examination report(s) may provide information on detected data packet flow(s) (e.g. 494) from networks (e.g. 440).

According to some of the various embodiments, the process may also comprise receiving event information 405 via communications interface(s). Event information may describe at least one network event. Examples of events comprise security event(s) such as an intrusion detection system alert, other type of system or networks monitoring and control event(s), combinations thereof, and/or the like. An event can be associated with a target, and a target can be associated with multiple events.

Examples of network event(s) comprise, for example, but are not limited to: firewall notice(s), intrusion detection system notice(s), intrusion prevention system notice(s), data loss prevention system notice(s), combinations thereof, and/or the like.

According to some of the various embodiments, correlation engine(s) 450 may be configured to generate correlation information from at least two of the following: at least some of the target information; at least some of the event information; at least some of the path information; and at least some of the flow information.

According to some of the various embodiments, correlation engine(s) 450 may correlate/serialize flows into path(s) employing the covert labels. For example, a network flows may be correlated if they share the same unique covert label.

These flows, therefore, may belong to the same path. These network flows may be serialized to form a path based on their time stamps and the locations of these flows as follows. The flows may be sequenced in one temporal direction based on timestamps when the flows are observed by sensor(s) 430. The flows may be put on a geo-referenced path on a map based on observed locations from sensor(s) 430. The direction of the path may be determined by the temporal direction of sequenced flows. If there is a gap between two correlated flows on a path and no observed flow bridges the gap, a virtual flow may be generated to bridge the gap on this path. There could be one or more correlated flows, zero, one or more virtual flows on one path.

According to some of the various embodiments, correlation engine(s) 450 may correlate different paths based on target (multiple attacks against the same target) or source (multiple attacks from the same source against multiple targets). The different paths may be correlated as follows. Paths may be associated with the same target if the covert labels are originated from the same assigned labelling agent associated with the target. The paths may be associated with the same source if the end node on the path is the same. Paths which share the same target may be correlated if their start time(s) are within a configurable time window measured by a degree of correlation. Paths which share the same source may be correlated if their start times are within a configurable time window measured by a degree of correlation. The degree of correlation may be calculated by $\alpha \exp(-\beta\tau)$ where $\alpha$ is a normalization constant, and $\beta$ is scaling constant, $\exp(\ )$ is the exponential function, and $\tau$ is the time difference between two timestamps of two correlated paths.

According to some of the various embodiments, correlation engine(s) 450 may correlate identify critical nodes in a network based on the identified paths. For each node on identified path(s), the number of paths that pass each node may be counted. Specifically, each node with a vector (X, Y) may be associated, where X may be the number of attack paths that pass the node toward the target(s) and where Y may be the number of attack paths that pass the node leaving the targets. Criticality may be a monotonic function of (X, Y) in that the bigger X and/or Y are, the bigger the criticality is.

According to some of the various embodiments, a node may be a critical node if its criticality exceeds a configurable threshold. Critical nodes may comprise nodes of special interest from defense and/or forensics perspectives, and the values of X and Y represent how much and in which direction the node has been involved in the attack(s). For example, the attack entry point of an enterprise network may be likely to have a big X and small Y, and the attack exit point, if different from the entry point, may likely have a small X and big Y. A stepping stone involved in the network based attack may be likely to have both big X and big Y.

A critical node may be employed as an indication of path overlapping. A path overlapping multiple times (e.g. more than a threshold), may be an indication of a stepping stone employed in an attack path. This may be especially true, then a path that includes a critical node correlates with an event.

According to some of the various embodiments, network flow monitoring and analysis may be reactive. In these situations, correlation engine(s) 450 may be invoked and/or started upon at least one of the following: receiving examination report(s); and/or receiving at least some event information. In other words, if a controller (e.g. 410), for example received an intrusion report (e.g. 405), the controller (e.g. 410) may send instructions to flow labeling agent(s) (e.g.

420) over communications links (e.g. 425) to start labeling data packet flow(s) 490. The instructions may instruct flow labeling agent(s) (e.g. 420) to label specific data packet flow(s) 490 depending on the details of the intrusion report (e.g. 405). Sensor(s) (e.g. 430) may then be activated over communications link(s) (e.g. 435) and instructed to start looking for the data packet flow with identified labels (e.g. 494). The results of the observations may be reported back to the controller (e.g. 410) and correlated by correlation engine(s) (e.g. 450). This is an example of reactive network flow monitoring and analysis.

According to some of the various embodiments, network flow monitoring and analysis may be proactive. In these cases, the flow labeling agent(s) (e.g. 420) may be instructed over communications links (e.g. 425) to label data packet flow(s) 490 before an intrusion is detected. Sensor(s) (e.g. 430) may be activated over communications link(s) (e.g. 435) and instructed to look for the data packet flow with identified labels (e.g. 494). The results of the observations may be reported back to the controller (e.g. 410) and correlated by correlation engine(s) (e.g. 450). In some embodiments, the results may be stored for future analysis. In other embodiments, the results may be stored on a rolling basis, keeping for example, results for a defined period of time, such as an hour, a day, a week, and so on. In some embodiments, the data may be analyzed as soon as an event occurs. The analysis may continue in real-time or near real-time. Sometimes the correlation analysis may occur after the fact, looking for patterns of previously detected events.

According to some of the various embodiments, network flow monitoring and analysis system 400 may employ bidirectional secured communication infrastructure(s). A bidirectional secured communication infrastructure(s) may interconnect multiple devices, either directly or through a multitude of networks and connections. The bidirectional secured communication infrastructure(s) may, for example, connect various combinations of sensor(s) (e.g. 430), correlation engine(s) (e.g. 450), flow labeling agent(s) (e.g. 420), controller(s) (e.g. 410), storage 460, event detector(s), combinations thereof, and/or the like. For example, bidirectional secured communication infrastructure(s) may connect at least one controller (e.g. 410) and at least one flow labeling agent (e.g. 420). In another example, bidirectional secured communication infrastructure(s) may connect at least one controller (e.g. 410) and at least one sensor (e.g. 430). In yet another example, bidirectional secured communication infrastructure(s) may connect multiple controller(s) (e.g. 410). At least part of the bidirectional secured communication infrastructure comprises at least one of the following: the Internet, at least one intranet, at least one wireless network, at least one wired network, at least one cellular network, at least one wide area network, at least one local area network, a shared memory, a wired connection, a wireless connection, and a communications bus.

According to some of the various embodiments, the network flow monitoring and analysis system 400 may employ database(s) and/or other storage mechanisms (e.g. 460). The storage and/or database(s) (e.g. 460) may be configured to store at least one of the following: at least some target information, at least some event information, at least some path information, and at least some flow information. Storage and/or database(s) (e.g. 460) may employ communications link(s) to communicate with other components, agents, modules, engines, combinations thereof, and/or or the like via communications links. For example, storage and/or database(s) (e.g. 460) may employ communications link(s) to communicate with controller(s) (e.g. 410) and/or correlation engine(s) (e.g. 450). Through these or similar connections, correlation engine(s) (e.g. 450) may be configured to receive at least two of the following from a database (e.g. 460): at least some target information, at least some event information, at least some path information, and at least some flow information. According to some of the various embodiments, storage and/or database(s) (e.g. 460) may comprise a knowledge base. The knowledge base may be configured to store at least some of the correlation information.

According to some of the various embodiments, the network flow monitoring and analysis system 400 may employ a controller manager configured to, for example, manage at least one of the controller(s) (e.g. 410). The controller manager may also be configured to communicate over at least one network interface with at least one user interface client. User interface client(s) may be employed to enable user(s) and/or other system(s) to interface with various aspects of the network flow monitoring and analysis system 400. The user interfaces may employ at least three types of user interfaces: (1) command language interfaces where program-specific instructions or codes are employed, (2) menu interfaces where a user may choose commands from displayed lists, and (3) graphical user interface (GUI) where commands and data may be presented to the system by selecting and clicking on icons displayed on the screen. Examples of user interface clients comprises at least one of the following: a thick user interface client, a workstation user interface client, a web-based user interface client, and a mobile user interface client. A thick user interface client may be employed with a networked system where a majority of resources installed locally, rather than distributed over a network. A workstation user interface client may comprise a client that depends heavily on another system to fulfill computational roles. A web-based user interface client may accept input and provide output via generating web pages which may be transmitted via a network and viewed by a user using a web browser type program. A mobile user interface client may accept input and provide output via pages configured to be employed with a mobile device, such as for example, a mobile phone, a tablet, and/or the like.

According to some of the various embodiments, the network flow monitoring and analysis system 400 may employ a correlation mechanism such as, for example, a correlation engine (e.g. 450). Correlation may locate mutual relationships between phenomena, behaviors, occurrences, things, combinations thereof, and/or the like. The correlation engine (e.g. 450) may correlate, for example, data packet flow behavior to determine relationships between data packet flows, their paths, their origins, their targets, events, combinations thereof, and/or the like. For example, correlation may be employed to correlate a source to an event, correlate a source to a data flow path, correlate a data flow path to a target, combinations thereof, and/or the like.

According to some of the various embodiments, the correlation engine (e.g. 450) may analyze correlation information. Correlation information may comprise, for example, but not be limited to: target information, path information, flow information, source information, event information, combinations and/or the like. The correlation engine (e.g. 450) may be configured to generate multiple degrees of correlation. The multiple degrees of correlation may comprise: deterministic correlations; and non-deterministic correlations. Deterministic correlations are based on the presumption that a particular result may be determined from an input without having to account for randomness. In other words, a deterministic correlation assumes that for a particular system, a given starting condition or initial state will produce the same result. A non-deterministic correlation assumes that even for the same input, a system may exhibit different behaviors. According to some of the various embodiments, the correlation engine (e.g. 450) may be configured to normalize non-deterministic correlations. Additionally, correlation engine(s) (e.g. 450) may be configured to apply one or more damping factors to correlation information. The damping factors may be set and/or comprise, at least in part, at least one of the following: time intervals, percentages of paths overlap, a combination of the above, and/or the like.

According to some of the various embodiments, the network flow monitoring and analysis system 400 may employ a visualization module configured to visualize the degrees of correlations using distinct visual symbols.

According to some of the various embodiments, correlation engine(s) (e.g. 450) may be configured to generate at least one network traffic path if various correlations are detected. An example of such a correlation comprises a correlation of at least two parts of a data packet flow that belong to the same path, regardless of their source or destination addresses. Another example correlation comprises a correlation of at least a portion of a path for at least two parts of a data packet flow overlapping. Yet another example correlation comprises a correlation of a gap between at least two parts of a data packet flow on a similar path where there is no observed flow bridging the gap. In this scenario, a network path may follow a virtual flow that bridges the gap on this path. The correlation could comprise one or more correlated flows, zero, one or more virtual flows on such as bridged path. Yet another example correlation comprises a correlation of at least two correlating data packet flows that each have a part of at least one correlated target and event. Another example correlation comprises a correlation of an event with a specific data packet flow where there is at least one other data packet flow on the same path that is correlated to the event. Yet another example correlation comprises a correlation of at least two data packet flows that share a common target. Yet another example correlation comprises a correlation of an event with a specific data packet flow where a portion of a path for at least two parts of the data packet flow overlap. Yet another example correlation comprises a correlation of multiple targets with a specific data packet flow where at least two parts of the data packet flow overlap.

According to some of the various embodiments, correlation engine(s) (e.g. 450) may be configured to correlate more network events. For example, correlation engine(s) (e.g. 450) may be configured to correlate a data packet flow with an event when the path of the data packet flow includes a target that is correlated with the event. In another example, correlation engine(s) (e.g. 450) may be configured to correlate a data packet flow with an event when the path of the data packet flow includes a target that is correlated with the event. In yet another example, correlation engine(s) (e.g. 450) may be configured to correlate a first data packet flow with an event when the path of the first data packet flow overlaps a second data packet flow path that is correlated with the event. In another example, correlation engine(s) (e.g. 450) may be configured to correlate a first data packet flow with a target when the path of the first data packet flow overlaps the path of a second data packet flow that includes the target. In another example, correlation engine(s) (e.g. 450) may be configured to correlate a data packet flow with a target when the path of the data packet flow correlates with an event that correlates with the target. In another example, correlation engine(s) (e.g. 450) may be configured to correlate an event with a first data packet flow path when the first data packet flow path overlaps a second data packet flow path that is correlated to the event. In another example, correlation engine(s) (e.g. 450) may be configured to correlate a first data packet flow with a second data packet flow when at least part of a path for the first data packet flow overlaps at least part of a path for the second data packet flow.

Figure 5:
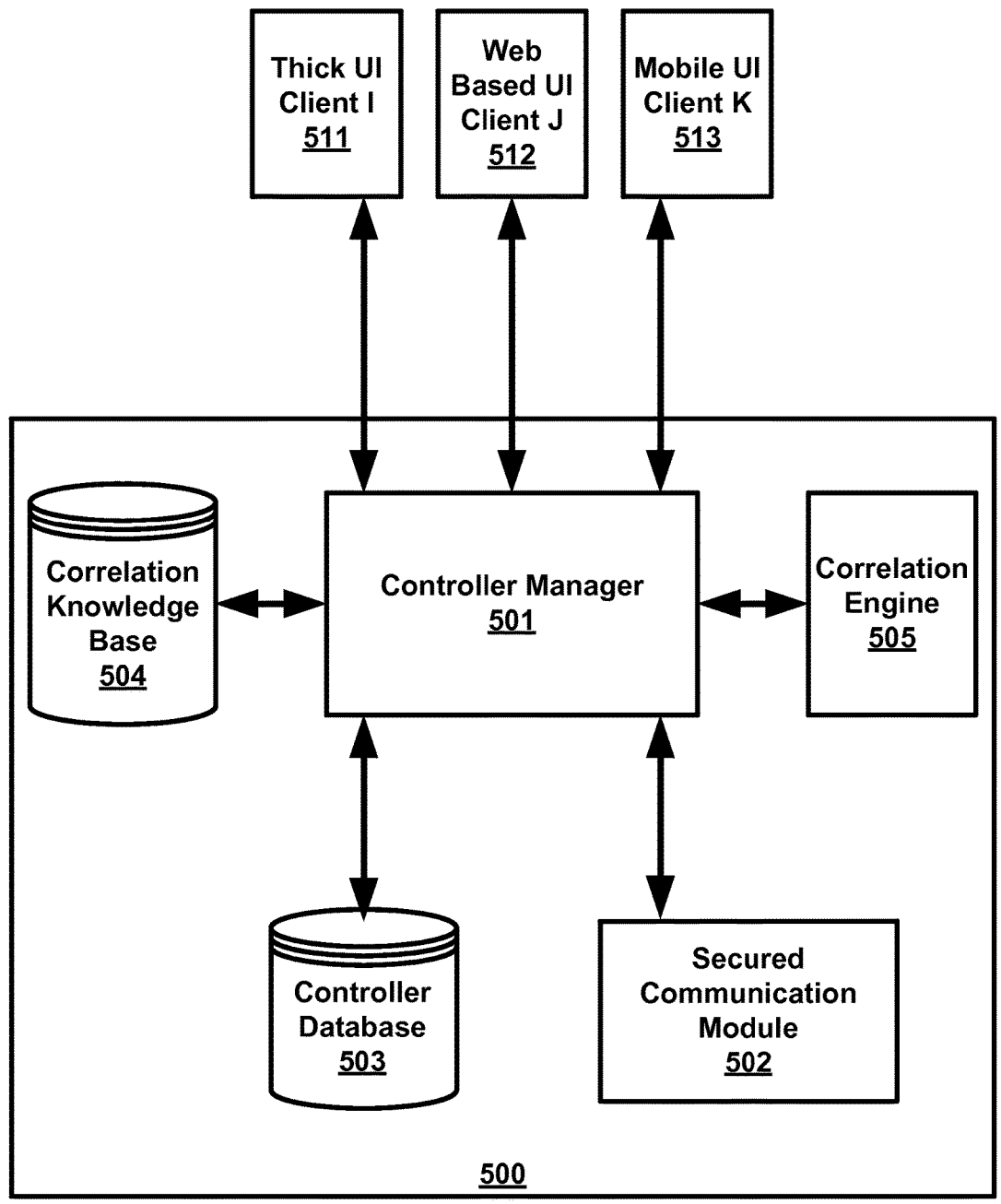
FIG. 5 is a block diagram illustrating a system architecture of a controller as per various aspects of an embodiment of the present invention.

Example FIG. 5 is a block diagram illustrating a system architecture of a controller 500 as per various aspects of an embodiment of the present invention. Controller server 500 may comprise a controller manager 501, a secured communication module 502, a controller database 503, a correlation knowledge base 504, and a correlation engine 505.

The controller manager 501 may direct the operations within the controller server 500. The controller manager 501 may manage communications with different user interface (UI) clients, including thick UI client (or workstation UI client) 511, web-based UI client 512, and mobile UI client 513.

The controller manager 501 may be configured to manage processing and communication resources. Processing may be performed by one or more processors executing machine readable instructions to perform tasks such as, for example: correlation, communications, data storage, interfacing with device and networks, memory management, disk management, virus checking, combinations thereof, and/or the like. Some of the tasks may involve concurrent processes. In such a case, the controller manager 501 may allocate resources for and schedule the processes. In some embodiments, tasks may be threads. Tasks may comprise background tasks and foreground tasks.

The secured communication module 502 may be configured to handle communications with sensors, flow labelling agents, and other controllers. The controller database 503 stores the information of targets, events, and paths. The correlation engine 505 takes the input from the controller database 503 and produces the correlations that are stored in the correlation knowledge base 504.

Figure 6:
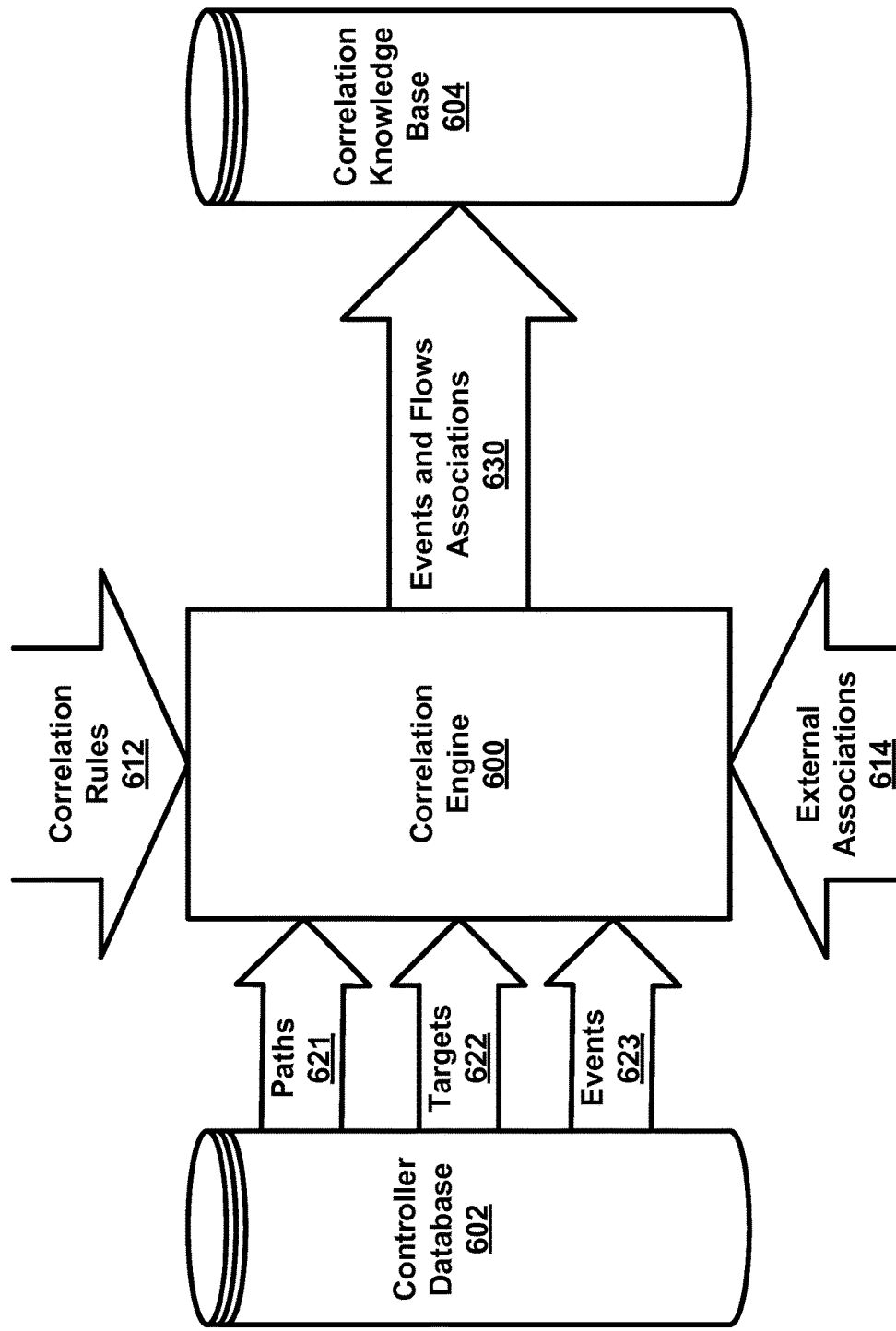
FIG. 6 is a block diagram illustrating the correlation of targets, events, and flows (stored in the controller database) through a correction engine to produce a set of targets, events and flows correlations (stored in the target-event-flow correlation knowledge base as per various aspects of an embodiment of the present invention.

Example FIG. 6 is a block diagram illustrating the correlation of targets 622, events 623, and paths 621 (stored in controller database 602) through correction engine 600 to produce a set of targets, events and flows correlations 630 for storage in a target-event-flow correlation knowledge base 604 as per various aspects of an embodiment of the present invention. Correlation(s) may be performed based on configurable correlation rules 612. Additionally, the correlation engine 600 may receive and employ external correlations 614.

Figure 7:
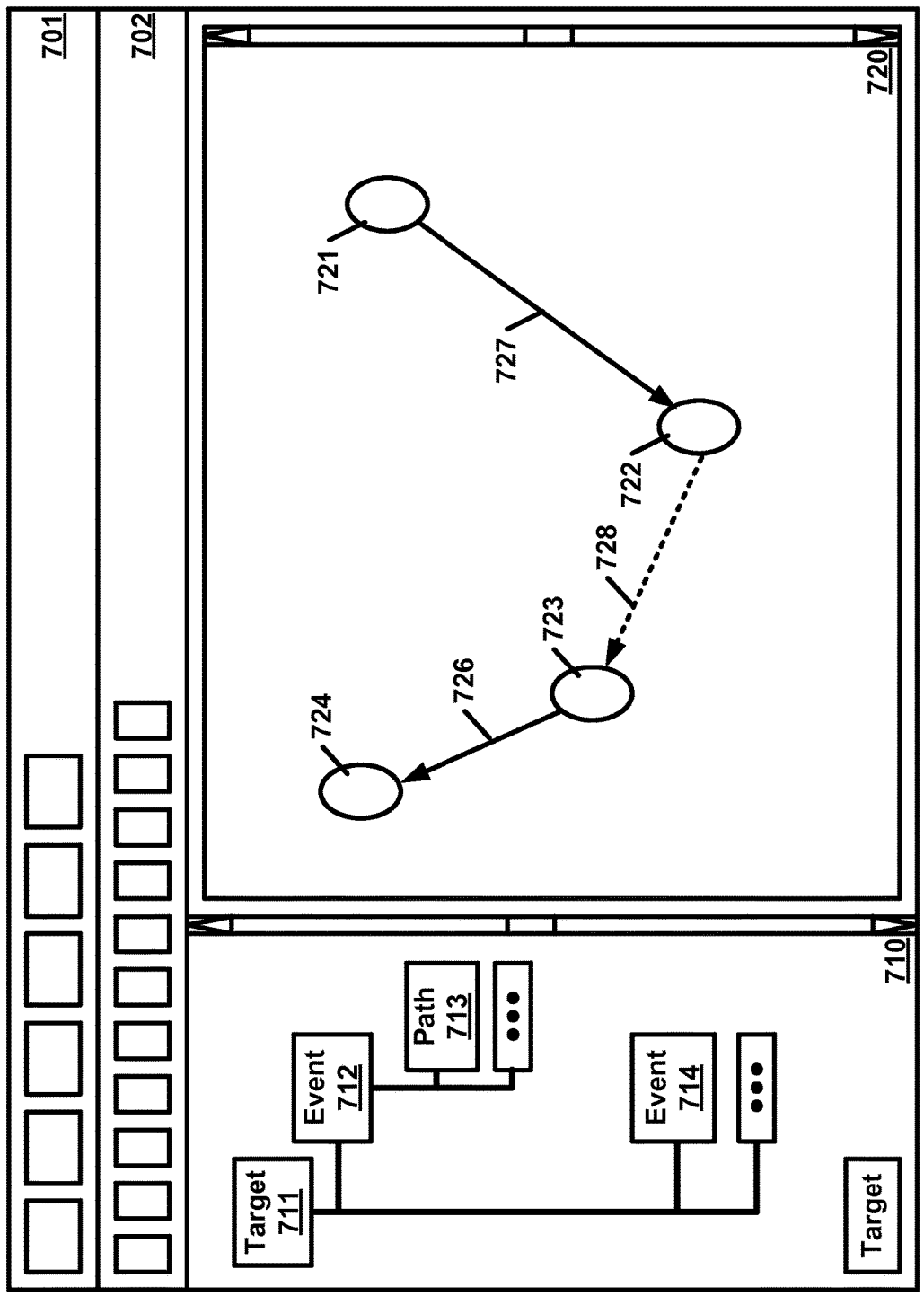
FIG. 7 is a diagram of a screen display showing correlations between a target and multiple events, between an event and multiple paths, and a display of a specific path containing multiple flows as per various aspects of an embodiment of the present invention.

Example FIG. 7 is a diagram of a screen display showing correlations between a target 711 and multiple events (e.g. 712, 714, . . . ) and between an event 712 and multiple paths (e.g. 713 . . . ), and a display of a specific path containing multiple flows in a correlation view panel 710 as per various aspects of an embodiment of the present invention. In addition, panel 720 shows a display of a specific path containing multiple flows (e.g. 726, 727) with source nodes (e.g. 723, 721) and destination nodes (e.g. 724, 722) respectively. In this example, the flow between source node 722 and destination node 723 may be virtualized from the flows 727 and 726 in order to form an integral path. Different graphical symbols may be employed to differentiate actual observed flows (e.g. 726, 727) and virtual flows (e.g. 728). The display may also comprise header sections 701 and 702 comprising various display and control elements.

Figure 8:
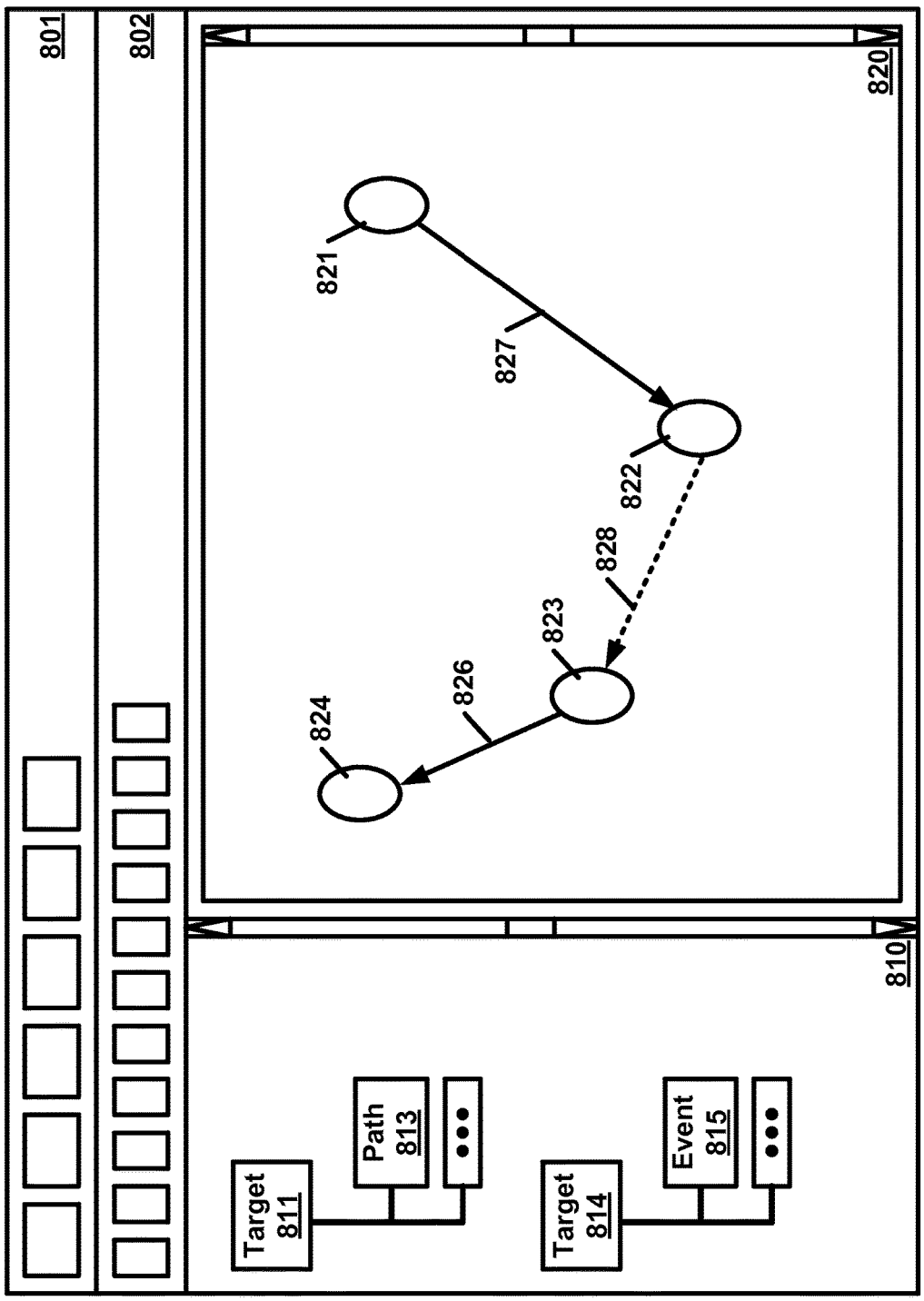
FIG. 8 is a diagram of a screen display showing a view of correlations between a target with multiple paths, and a target with multiple events as per various aspects of an embodiment of the present invention.

Example FIG. 8 is a diagram of a screen display showing a view of correlations between a target 811 with multiple paths (e.g. 813), and a target 814 with multiple events (e.g. 815) as per various aspects of an embodiment of the present invention. Path 813: traverses as flow 827 from source node 821 to intermediate node 822; traverses as virtual flow 828 from intermediate node 922 to node 823; and traverses as flow 826 from intermediate node 823 to destination node 824. Path 815: traverses as flow 837 from source node 833 to intermediate node 822; traverses as virtual flow 828 from intermediate node 822 to intermediate node 823; and traverses as flow 826 from intermediate node 823 to destination node 824. The display may also comprise header sections 801 and 802 comprising various display and control elements.

Figure 9:
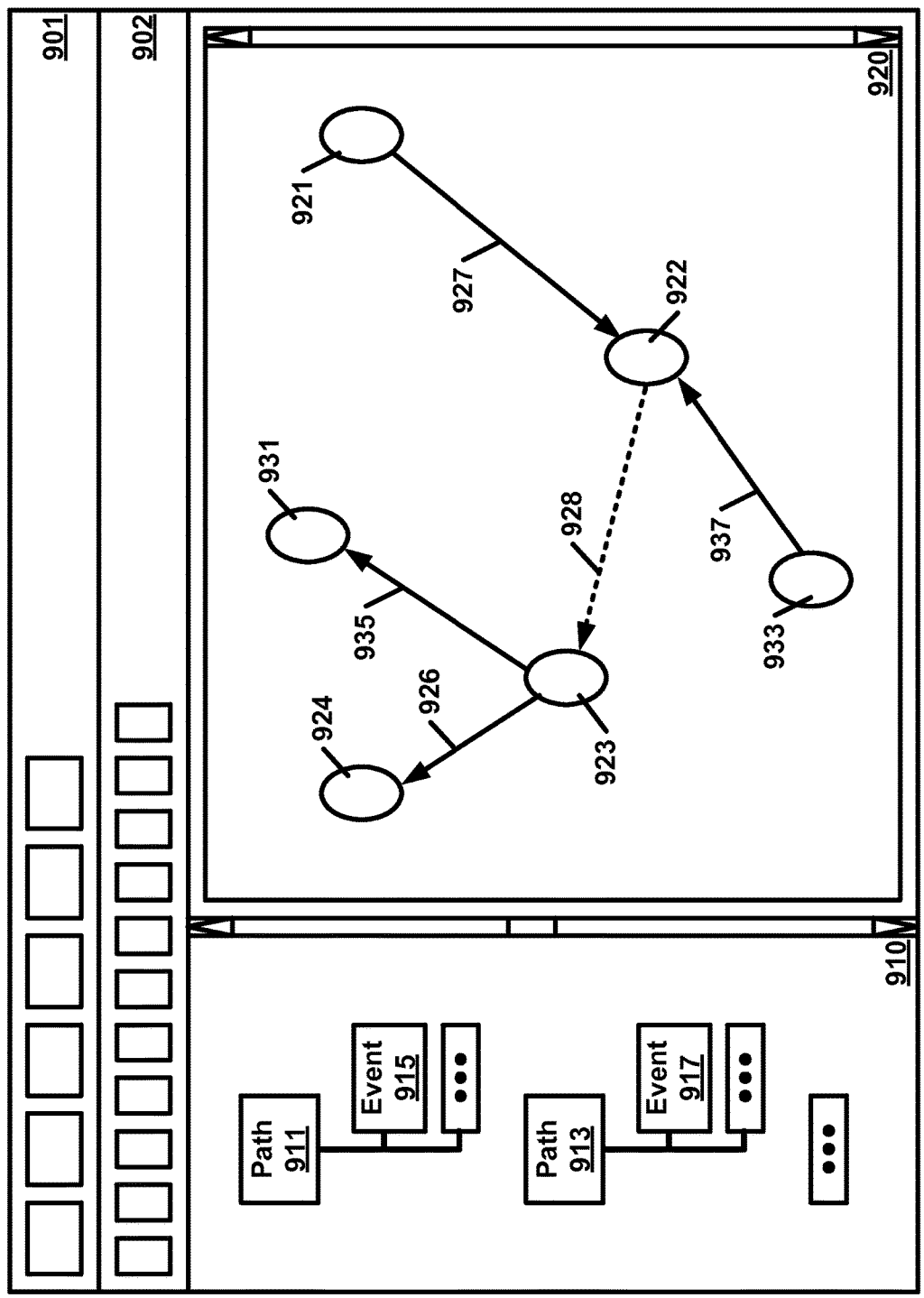
FIG. 9 is a diagram of a screen display showing correlations between multiple paths and events as per various aspects of an embodiment of the present invention.

Example FIG. 9 is a diagram of a screen display showing a view of correlations between a path 911 with multiple paths (e.g. 913), and a path 914 with multiple events (e.g. 917) as per various aspects of an embodiment of the present invention. Specifically, this example illustration is a view of the correlations between two paths 911 and 913 with multiple events (e.g. 915 and 917 respectively), as well as an example display of the two paths 911 (927, 928, 926) and 913 (937, 928, 935). Path 911: traverses as flow 927 from source node 921 to intermediate node 922; traverses as virtual flow 928 from intermediate node 922 to intermediate node 923; and traverses as flow 935 from intermediate node 923 to destination node 931. Path 913: traverses as flow 937 from source node 933 to intermediate node 922; traverses as virtual flow 928 from intermediate node 922 to intermediate node 923; and traverses as flow 926 from intermediate node 923 to destination node 924. Because a portion 928 of the two paths 911, 913 overlap, a correlation engine may infer, for example, a non-deterministic correlation (or a weak correlation) between the events 915, 917. The display may also comprise header sections 901 and 902 comprising various display and control elements.

Figure 10:
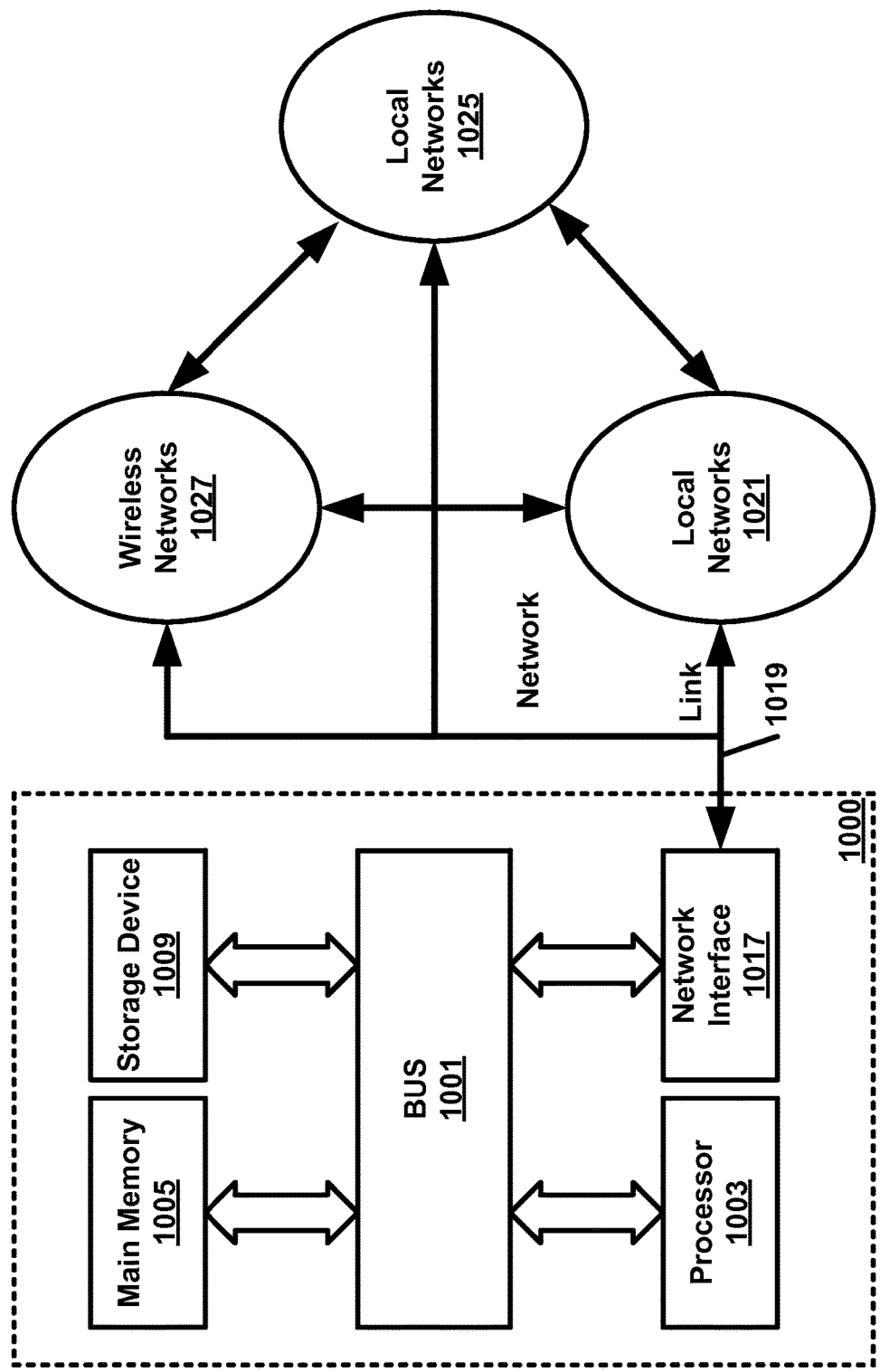
FIG. 10 is a block diagram of a hardware configuration employed as per various aspects of an embodiment of the present invention.

Example FIG. 10 is a block diagram of a hardware configuration employed used for implementation as per various aspects of an embodiment of the present invention. The embodiments of the present invention are not limited to any specific combination of hardware and software.

The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. A storage device 1009, such as a magnetic disk or optical disk, is coupled to the bus 1001 for persistently storing information and instructions.

According to one embodiment of the invention, security event and path correlations for creation, search, retrieval, and display is provided by the computer system 1000 in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein.

The computer system 1000 also includes a network interfaces 1017 coupled to bus 1001. The network interface 1017 provides a two-way data communication coupling to a network link 1019 connected to a local network 1021 or connected to a wireless network 1027, or directly to internet 1025. For example, network interface 1017 may be an Ethernet™ card to provide a data communication connection to a compatible LAN. Wireless links can also be implemented. In any such implementation, network interface 1017 sends and receives electrical, electromagnetic, or optical signals that carry digital data streams representing various types of information. Although a single network interface 1017 is depicted in FIG. 10, multiple network interfaces can also be employed.

The network link 1019 typically provides data communication through one or more networks to other data devices. For example, the network link 1019 may provide a connection through local network 1021 to a host computer, which has connectivity to a network 1025 (e.g. a wide area network (WAN) or the global packet data communication network now commonly referred to as the "Internet"). The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send and receive data, including messages and other data through the network(s), the network link 1019, and the communication interface 1017.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal hand held device or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on a storage device either before or after execution by a processor.

Figure 11:
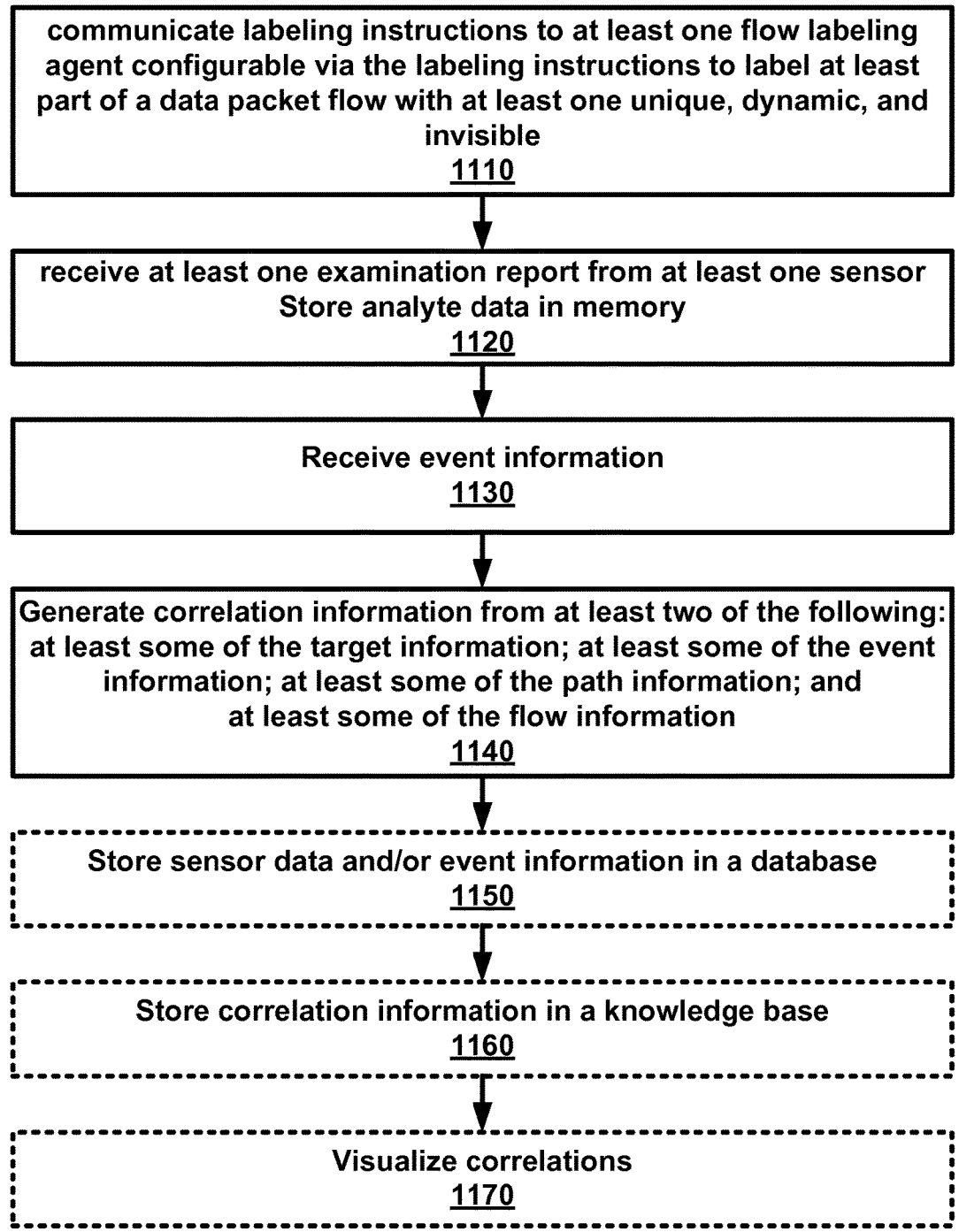
FIG. 11 is a flow diagram of a network flow monitoring and analysis controller actions as per various aspects of an embodiment of the present invention.

Example FIG. 11 is a flow diagram of a network flow monitoring and analysis controller actions as per various aspects of an embodiment of the present invention. According to some of the various embodiments, a network flow monitoring and analysis controller may comprise at least one processor, at least one communications interface, and at least one non-transitory computer readable medium comprising instructions configured to cause the at least one processor to perform a network flow monitoring and analysis process. At 1110, the network flow monitoring and analysis controller may employ at least one communications interface to communicate labeling instructions to at least one flow labeling agent. The flow labeling agent may be configurable via the labeling instructions to label at least part of a data packet flow with at least one unique and covert label. At 1120, at least one examination report may be received from at least one sensor via at least one communications interface. The sensor may be configurable to: observe at least part of the data packet flow for the unique and covert label(s) and generate examination report(s). The examination report(s) may comprise sensor data. The sensor data may comprise at least one of the following: target information, path information, and flow information.

According to some of the various embodiments, event information may be received at 1130 by the network flow monitoring and analysis controller via the communications interface(s). At 1140, correlation information may be generated from at least two of the following: at least some of the target information, at least some of the event information, at least some of the path information, and at least some of the flow information.

According to some of the various embodiments, the process may further comprise storing at least one of the following in a database at 1150: at least some of the target information, at least some of the event information, at least some of the path information, and at least some of the flow information. According to some of the various embodiments, the process may further comprise storing at least some of the correlation information in a knowledgebase at 1160. The process may further comprise visualizing the degrees of correlations using distinct visual symbols at 1170.

Figure 12:
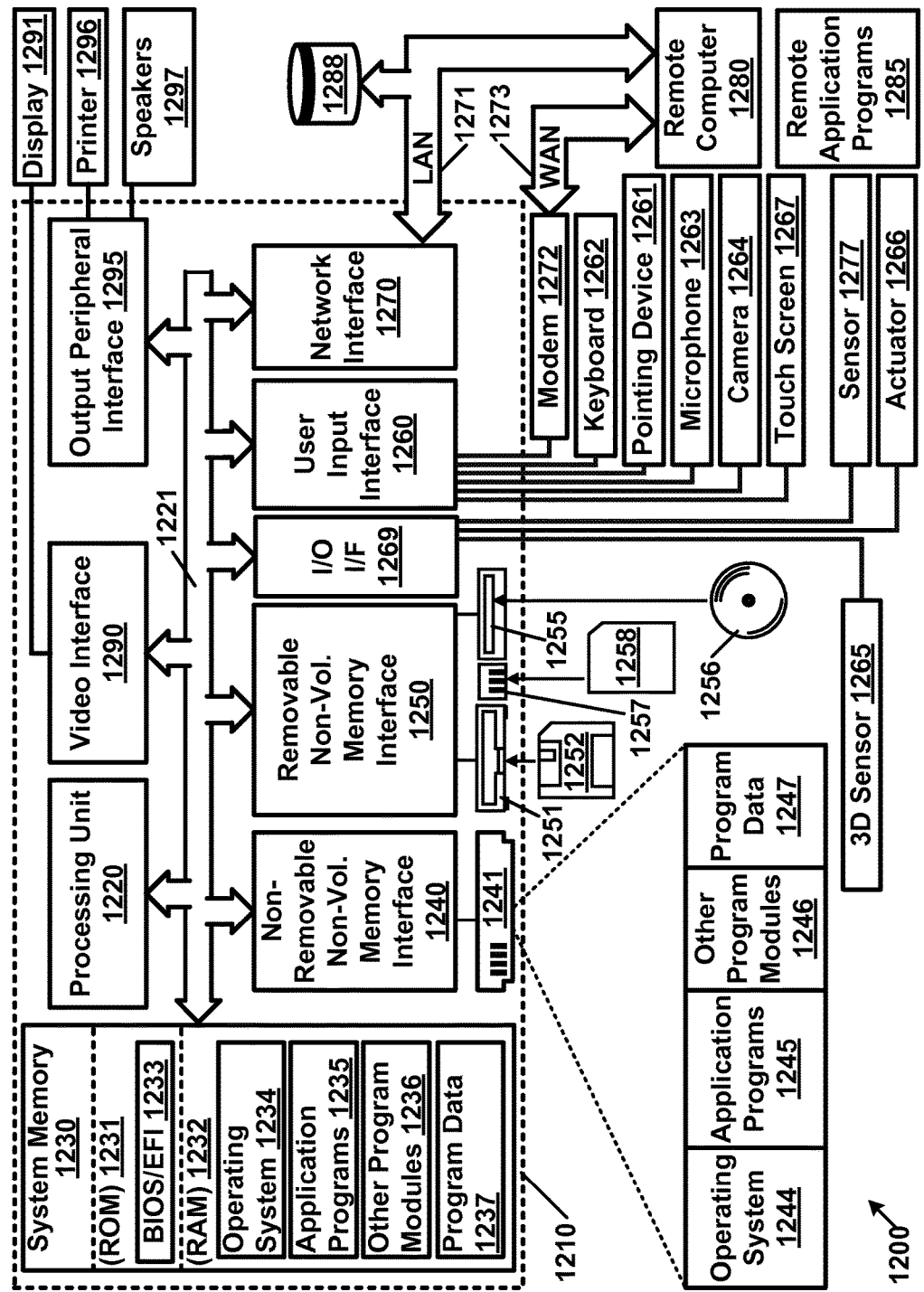
FIG. 12 illustrates a computing system environment on which aspects of some embodiments may be implemented.

FIG. 12 illustrates an example of a computing system environment 1200 on which aspects of some embodiments may be implemented. The computing system environment 1200 is only one example of a computing environment and is not intended to suggest any limitation as to the scope of use or functionality of the claimed subject matter. Neither should the computing environment 1200 be interpreted as having any dependency or requirement relating to any one or combination of components illustrated in the example operating environment 1200.

Embodiments are operational with numerous other general purpose or special purpose computing system environments or configurations. Examples of well-known computing systems, environments, and/or configurations that may be suitable for use with various embodiments include, but are not limited to, embedded computing systems, personal computers, server computers, mobile devices, hand-held or laptop devices, multiprocessor systems, microprocessor-based systems, set top boxes, programmable consumer electronics, medical device, network PCs, minicomputers, mainframe computers, cloud services, telephony systems, distributed computing environments that include any of the above systems or devices, and the like.

Embodiments may be described in the general context of computer-executable instructions, such as program modules, being executed by computing capable devices. Generally, program modules include routines, programs, objects, components, data structures, etc. that perform particular tasks or implement particular abstract data types. Some embodiments may be configured to be practiced in distributed computing environments, where tasks are performed by remote processing devices that are linked through a communications network. In a distributed computing environment, program modules may be located in both local and remote computer storage media, including memory storage devices.

With reference to FIG. 12, an example system for implementing some embodiments includes a computing device 1210. Components of computer 1210 may include, but are not limited to, a processing unit 1220, a system memory 1230, and a system bus 1221 that couples various system components including the system memory to the processing unit 1220.

Computing device 1210 may comprise a variety of computer readable media. Computer readable media may be any available media that can be accessed by computing device 1210 and includes both volatile and nonvolatile media, and removable and non-removable media. By way of example, and not limitation, computer readable media may comprise computer storage media and communication media. Computer storage media may comprise volatile and/or nonvolatile, and/or removable and/or non-removable media implemented in any method or technology for storage of information such as computer readable instructions, data structures, program modules or other data. Computer storage media comprises, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 1210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media configured to communicate modulated data signal(s). Combinations of any of the above should also be included within the scope of computer readable media.

The system memory 1230 includes computer storage media in the form of volatile and/or nonvolatile memory such as ROM 1231 and RAM 1232. A basic input/output system (BIOS) and/or extensible Firmware Interface (EFI) 1233 containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237 that may be stored in RAM 1232.

Computer 1210 may also include other removable/non-removable volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, a flash drive reader 1257 that reads flash drive 1258, and an optical disk drive 1255 that reads from or writes to a removable, nonvolatile optical disk 1256 such as a Compact Disc Read Only Memory (CD ROM), Digital Versatile Disc (DVD), Blue-ray Disc™ (BD) or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12 provide storage of computer readable instructions, data structures, program modules and other data for the computer 1210. In FIG. 12, for example, hard disk drive 1241 is illustrated as storing operating system 1244, application programs 1245, program data 1247, and other program modules 1246. Additionally, for example, non-volatile memory may include instructions to, for example, discover and configure IT device(s); the creation of device neutral user interface command(s); combinations thereof, and/or the like.

A user may enter commands and information into the computer 1210 through input devices such as a keyboard 1262, a microphone 1263, a camera 1264, touch screen 1267, and a pointing device 1261, such as a mouse, trackball or touch pad. These and other input devices are often connected to the processing unit 1220 through a user input interface 1260 that is coupled to the system bus, but may be connected by other interface and bus structures, such as a parallel port, game port or a universal serial bus (USB).

Sensors 1227 and actuators 1266 may be connected to the system bus 1221 via an Input/Output Interface (I/O I/F) 1269. A 3D sensor 1265 may be connected to the system bus 1221 via an Input/Output Interface (I/O I/F) 1269. Examples of 3D sensor(s) 1265 comprise an accelerometer, an inertial navigation unit, a 3D digitizer, and/or the like. A monitor 1291 or other type of display device may also connected to the system bus 1221 via an interface, such as a video interface 1290. Other devices, such as, for example, speakers 1297 and printer 1296 may be connected to the system via peripheral interface 1295.

The computer 1210 is operated in a networked environment using logical connections to one or more remote computers, such as a remote computer 1280. The remote computer 1280 may be a personal computer, a mobile device, a hand-held device, a server, a router, a network PC, a medical device, a peer device or other common network node, and typically includes many or all of the elements described above relative to the computer 1210. The logical connections depicted in FIG. 12 include a local area network (LAN) 1271 and a wide area network (WAN) 1273, but may also include other networks such as, for example, a cellular network. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. The modem 1272 may be wired or wireless. Examples of wireless devices may comprise, but are limited to: Wi-Fi, Near-field Communication (NFC) and Bluetooth™. In a networked environment, program modules depicted relative to the computer 1210, or portions thereof, may be stored in the remote memory storage device 1288. By way of example, and not limitation, FIG. 12 illustrates remote application programs 1285 as residing on remote computer 1280. It will be appreciated that the network connections shown are exemplary and other means of establishing a communications link between the computers may be used. Additionally, for example, LAN 1271 and WAN 1273 may provide a network interface to communicate with other distributed infrastructure management device(s); with IT device(s); with users remotely accessing the User Input Interface 1260; combinations thereof, and/or the like.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element) or a combination thereof, all of which are behaviorally equivalent. For example, modules may be implemented using computer hardware in combination with software routine(s) written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) tracing to the source of a cyber-attack using correlation. However, one skilled in the art will recognize that embodiments of the invention could be employed to track routing of packet flow related to messaging, content streaming, and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A network flow monitoring and analysis system, comprising:
   a) at least one flow labeling agent configurable via labeling instructions to label at least part of a data packet flow with at least one unique and covert label; and
   b) at least one sensor configurable to:
      i) observe at least part of the data packet flow for the at least one unique and covert label; and
      ii) generate at least one examination report, the at least one examination report comprising sensor data, the sensor data comprising:
         (1) location information;
         (2) time information;
         (3) label information; and
         (4) flow information;
   c) at least one controller comprising:
      i) at least one processor;
      ii) at least one communications interface; and
      iii) at least one non-transitory computer readable medium comprising instructions configured to cause the at least one processor to:
         (1) communicate, via at least one of the at least one communications interface, labeling instructions to at least one of the at least one flow labeling agent;
         (2) receive, via at least one of the at least one communications interface, at least one of the at least one examination report from at least one of the at least one sensor; and
         (3) receive, via at least one of the at least one communications interface, event information, the event information describing at least one event; and
   d) a correlation engine configured to:
      i) generate correlation information from at least two of the following:
         at least some of the location information;
         at least some of the time information;
         at least some of the event information;
         at least some of the label information; and
         at least some of the flow information;
      ii) temporally sequence the sensor data employing at least some of the time information;
      iii) geographically sequence the sensor data employing at least some of the location information;
      iv) determine a path direction of at least part of the data packet flow from the temporally sequence and geographically sequence; and
      v) generate multiple degrees of correlation, the multiple degrees of correlation comprising:
         deterministic correlations; and
         non-deterministic correlations.

2. The system according to claim 1, wherein the sensor data further comprises at least one of the following:
   a) target information; and
   b) path information.

3. The system according to claim 1, wherein the label is further configured to be dynamic.

4. The system according to claim 1, wherein the instructions are further configured to cause the at least one processor to invoke the correlation engine upon at least one of the following:
   a) receiving at least one of the at least one examination report; and
   b) receiving at least some event information.

5. The system according to claim 1, further comprising a bidirectional secured communication infrastructure configured to connect at least one of the following:
   a) at least one of the at last one controller and at least one of the at least one flow labeling agent;
   b) at least one of the at last one controller and at least one of the at least one sensor; and
   c) at least one of the at last one controller and at least one other of the at least one controller.

6. The system according to claim 5, wherein at least part of the bidirectional secured communication infrastructure comprises at least one of the following:
   a) the Internet;
   b) at least one intranet;
   c) at least one wireless network;
   d) at least one wired network;
   e) at least one cellular network;
   f) at least one wide area network;
   g) at least one local area network;
   h) a shared memory;
   i) a wired connection;
   j) a wireless connection; and
   k) communications bus.

7. The system according to claim 1, further comprising a database configured to store at least one of the following:
   a) at least some of the target information;
   b) at least some of the event information;
   c) at least some label information;
   d) at least some of the path information; and
   e) at least some of the flow information.

8. The system according to claim 7, wherein the correlation engine is further configured to receive at least two of the following from the database:
   a) at least some of the target information;
   b) at least some of the event information;
   c) at least some of the label information;
   d) at least some of the path information; and
   e) at least some of the flow information.

9. The system according to claim 1, further comprising a knowledge base configured to store at least some of the correlation information.

10. The system according to claim 9, wherein the correlation engine is further configured to store at least some of the correlation information in the knowledge base.

11. The system according to claim 1, further comprising a controller manager configured to manage at least one of the at least one controller.

12. The system according to claim 11, wherein the controller manager is configured to communicate over at least one network interface with at least one user interface client.

13. The system according to claim 1, wherein the correlation engine is further configured to apply one or more damping factors to correlation information, the damping factors set, at least in part, on at least one of the following:
   a) time intervals; and
   b) percentages of paths overlap; and
   c) a combination of the above.

14. The system according to claim 1, wherein the labeling instructions comprise at least one of the following:
   a) at least some of the label information;
   b) at least some of the flow information;
   c) at least some of the controller location;
   d) at least some of the label key information;
   e) instructions to find a labeled flow;
   f) instructions to identify a labeled flow;
   g) instructions to label data packets; and
   h) instructions to correlate packet flow data.

15. The system according to claim 1, wherein the correlation engine is further configured to generate at least one virtual flow to bridge a gap between at least two correlated flows.

16. The system according to claim 1, wherein the correlation engine is further configured to generate at least one network traffic path if at least one of the following correlations is detected:
   a) at least two parts of a data packet flow belong to the same path regardless of their source or destination addresses;
   b) at least a portion of a path for at least two parts of a data packet flow overlap;
   c) a gap between at least two parts of a data packet flow on a similar path and there is no observed flow bridging the gap;
   d) at least two correlating data packet flows that each have a par of at least one correlated target and event;
   e) an event is correlated with a specific data packet flow and there is at least one other data packet flow on the same path that is correlated to the event;
   f) at least two data packet flows share a common target;
   g) an event is correlated with a specific data packet flow and a portion of a path for at least two parts of the data packet flow overlap; and
   h) multiple targets correlated with a specific data packet flow have at least two parts of the data packet flow overlap.

17. The system according to claim 1, wherein the correlation engine is further configured to correlate at least one of the following:
   a) a data packet flow with an event when the path of the data packet flow includes a target that is correlated with the event;
   b) a first data packet flow with an event when the path of the first data packet flow overlaps a second data packet flow path that is correlated with the event;
   c) a first data packet flow with a target when the path of the first data packet flow overlaps the path of a second data packet flow that includes the target;
   d) a data packet flow with a target when the path of the data packet flow correlates with an event that correlates with the target;
   e) an event with a first data packet flow path when the first data packet flow path overlaps a second data packet flow path that is correlated to the event;
   f) a first data packet flow with a second data packet flow when at least part of a path for the first data packet flow overlaps at least part of a path for the second data packet flow;
   g) a first path and a second path to a target when at least a part of a first data packet flow and at least a part of a second data packet flow comprise at least one of the following:
      i) label information originating from the same at least one flow labeling agent; and
      ii) share common target information;
   h) a first path and a second path to a source when a first end node for at least part of a first data packet flow and a second end node for at least part of a second data packet flow are the same;
   i) a first path and a second path to each other when:
      i) the first path and the second path are both associated to the same target; and
      ii) the start time of the first path and the second path are within a time window measured by a degree of correlation; and
   j) a first path and a second path to each other when:
      i) the first path and the second path are both associated to the same source; and
      ii) the start time of the first path and the second path are within a time window measured by a degree of correlation.

18. The system according to claim 1, wherein the correlation engine is further configured to identify a specific node as a critical node when a count of identified paths that pass through the specific node exceeds a threshold.

* * * * *